(12) United States Patent
Shi et al.

(10) Patent No.: US 11,758,437 B2
(45) Date of Patent: Sep. 12, 2023

(54) LINK RECONFIGURATION PROCESSING METHOD AND RELATED PRODUCTS

(71) Applicant: GUANGDONG OPPO MOBILE TELECOMMUNICATIONS CORP., LTD., Guangdong (CN)

(72) Inventors: Zhihua Shi, Guangdong (CN); Wenhong Chen, Guangdong (CN); Zhi Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 163 days.

(21) Appl. No.: 17/228,115

(22) Filed: Apr. 12, 2021

(65) Prior Publication Data
US 2021/0235324 A1 Jul. 29, 2021

Related U.S. Application Data

(63) Continuation of application No. 16/923,714, filed on Jul. 8, 2020, now Pat. No. 11,006,322, which is a continuation of application No. PCT/CN2018/072515, filed on Jan. 12, 2018.

(51) Int. Cl.
*H04W 4/00* (2018.01)
*H04W 28/18* (2009.01)

(52) U.S. Cl.
CPC .................. *H04W 28/18* (2013.01)

(58) Field of Classification Search
CPC ............... H04W 28/18; H04W 72/042; H04W 72/0453; H04W 72/04; H04W 72/046; H04W 24/08; H04W 74/0833; H04L 5/0098

USPC ......................................................... 370/310
See application file for complete search history.

(56) References Cited

U.S. PATENT DOCUMENTS

| 11,006,322 | B2* | 5/2021 | Shi ...................... H04W 28/18 |
| 2012/0020230 | A1 | 1/2012 | Chen |
| 2012/0327874 | A1 | 12/2012 | Eriksson |
| 2013/0242730 | A1* | 9/2013 | Pelletier ............ H04W 74/0833 370/230 |
| 2017/0126439 | A1* | 5/2017 | Yoshimoto ........... H04B 7/0639 |
| 2018/0146433 | A1* | 5/2018 | Zhang ................. H04W 52/146 |
| 2018/0338262 | A1* | 11/2018 | Liu .................... H04W 28/0226 |

(Continued)

FOREIGN PATENT DOCUMENTS

| CN | 102255685 A | 11/2011 |
| CN | 102263583 A | 11/2011 |

(Continued)

OTHER PUBLICATIONS

International Search Report in the international application No. PCT/CN2018/072515, dated Sep. 26, 2018.

(Continued)

*Primary Examiner* — Maharishi V Khirodhar
(74) *Attorney, Agent, or Firm* — PERKINS COIE LLP (57) ABSTRACT

A link reconfiguration processing method includes: a network device indicates a preset parameter set to a terminal device, the preset parameter set being configured for a bandwidth part (BWP) of the terminal device, and the preset parameter set is used for performing corresponding processing operations by the terminal device during transmission over the BWP.

12 Claims, 3 Drawing Sheets

(56) References Cited

U.S. PATENT DOCUMENTS

| | | | |
|---|---|---|---|
| 2019/0053176 | A1 | 2/2019 | Lee et al. |
| 2020/0052868 | A1 | 2/2020 | Zhang et al. |

FOREIGN PATENT DOCUMENTS

| | | | |
|---|---|---|---|
| CN | 102282902 | A | 12/2011 |
| CN | 105850207 | A | 8/2016 |
| CN | 106162673 | A | 11/2016 |
| CN | 106233773 | A | 12/2016 |
| WO | 2011097796 | A1 | 8/2011 |
| WO | 2015166846 | A1 | 11/2015 |
| WO | 2016115654 | A1 | 7/2016 |

OTHER PUBLICATIONS

Rapporteur (Ericsson): "Minor corrections ASN.1 review 1", 3GPP Draft; Draft CR 38331-101 CLASS 1 Issues_Z_D_M2, 3rd Generation Partnership Project (3GPP), Mobile Competence Centre; 650, Route Des Lucioles; F-06921 Sophia-Antipolis Cedex; France, vol. RAN WG2, No. Vancouver, Canada; Jan. 22, 2018-Jan. 26, 2018, (Jan. 11, 2018), XP051545750, *p. 105* *p. 129-p. 132*.
3GPP Draft; List of RAN1 Agreements, 3rd Generation Partnership Project (3GPP), Mobile Competence Centre; 650, Route Des Lucioles; F-06921 Sophia-Antipolis Cedex; France, vol. RAN WG1, no.; Sep. 1, 2017, (Dec. 17, 2017), XP051364854, * p. 162-p. 163 * * p. 39 *.
Supplementary European Search Report in the European application No. 18899214.3, dated Nov. 16, 2020.
MediaTek, etc., Way Forward on bandwidth part in NR, 3GPP TSG-RAN WG1 #88bis R1-1706745 Spokane, USA, Apr. 3-7, 2017 Agenda item 8.1.3.3.1.
LG Electronics, Discussion on beam failure recovery, 3GPP TSG RAN WG1 Meeting #91 R1-1719908 Reno, USA, Nov. 27- Dec. 1, 2017.
Ericsson, Remaining details of beam recovery, Discussion and Decision, 3GPP TSG-RAN WG1 #91 R1-1720737, Nov. 27-Dec. 1, 2017.
Written Opinion of the International Search Authority in the international application No. PCT/CN2018/072515, dated Sep. 26, 2018.
First Office Action of the U.S. Appl. No. 16/923,714, dated Sep. 11, 2020.
Notice of Allowance of the U.S. Appl. No. 16/923,714, dated Jan. 13, 2021.
Corrected Notice of Allowance of the U.S. Appl. No. 16/923,714, dated Feb. 12, 2021.
First Office Action of the European application No. 18899214.3, dated Mar. 30, 2021.
Office Action of the Indian application No. 202027033985, dated Aug. 25, 2021. 7 pages with English translation.
3GPP TS 38.211 V15.0.0 (Dec. 2017), 3rd Generation Partnership Project; Technical Specification Group Radio Access Network; NR; Physical channels and modulation (Release 15). 73 pages.
European Search Report in the European application No. 22157482.5, dated May 6, 2022. 11 pages.
First Office Action of the Australian application No. 2018401520, dated Jun. 16, 2022. 3 pages.
First Office Action of the Taiwanese application No. 108101247, dated Jun. 21, 2022. 21 pages with English Translation.
3GPP TS38.213 V1 5.0.0(Dec. 2017)"3rd Generation Partnership Project;Technical Specification Group Radio Access Network;NR;Physical layer procedures for control(Release 15)". 56 pages.
3GPP TS38.321 V15.0.0(Dec. 2017),"3rd Generation Partnership Project; Technical Specification Group Radio Access Network;NR;Medium Access Control (MAC) protocol specification(Release 15)". 55 pages.
First Office Action of the Japanese application No. 2020-538075, dated Jan. 4, 2022. 17 pages with English translation.
Samsung,"Beam failure recovery"[online],3GP TSGRAN G1#91 R1/1720291,Internet<URL:http:/ww.3gp.org/ftp tsg_ran/WG1_RL1/TSGR1_91/Docs/R1-1720291.zip>,Nov. 27-Dec. 1, 2017. 9 pages.
Rapporteur (Ericsson), "Minor corrections ASN.1 review 1", 3GPP TSG-RAN WG2 NR Ad hoc 0118 R2-1801220, Vancouver, Canada, Jan. 22-Jan. 26, 2018. 216 pages.
First Office Action of the Chinese application No. 202010388704.6, dated Nov. 1, 2022. 12 pages with English translation.
InterDigital Inc. "Control Plane Impacts of BWP", 3GPP TSG-RAN WG2 Meeting #100 R2-1712795, Reno, USA, Nov. 27-Dec. 1, 2017. 4 pages.
Mediatek Inc. "TP to Support BWP Operation in Stage-3 RRC", 3GPP TSG-RAN WG2 #100 R2-1713942, Reno, USA, Nov. 27-Dec. 1, 2017. 11 pages.
Qualcomm Incorporated, "Remaining control plane issues of BWP", 3GPP TSG-RAN WG2 Meeting #100 R2-1713885, Reno, USA, Nov. 27-Dec. 1, 2017. 7 pages.
First Office Action of the Korean application No. 10-2020-7022327, dated Nov. 23, 2022. 10 pages with English translation.
Second Office Action of the Korean application No. 10-2020-7022327, dated May 18, 2023. 6 pages with English translation.

* cited by examiner

LINK RECONFIGURATION PROCESSING METHOD AND RELATED PRODUCTS

CROSS-REFERENCE TO RELATED APPLICATIONS

The application is a continuation of U.S. patent application Ser. No. 16/923,714, filed Jul. 8, 2020, which is a continuation application of International Application No. PCT/CN2018/072515, filed on Jan. 12, 2018. The contents of these applications are incorporated herein by reference in their entirety.

BACKGROUND

In New Radio (NR), one carrier may include a plurality of bandwidth parts (BWP). For one terminal device, only one uplink BWP (UL BWP) can be activated for uplink transmission at one time. Similarly, only one downlink BWP (DL BWP) can be activated for downlink transmission at one time. Downlink control information (DCI) or the like indicates which BWP is activated for the terminal device, and the terminal device may dynamically switch to one of the plurality of BWPs in the carrier and use the BWP for transmission. How to efficiently configure the terminal device to perform transmission on different BWPs is a technical problem that needs to be solved.

SUMMARY

This disclosure relates to the field of communications technologies, and in particular, to a method for processing link reconfiguration and a related product.

Embodiments of this disclosure provide a method for processing link reconfiguration and a related product, which help to more flexibly configure processing operations that need to be performed during transmission on different BWPs, thereby improving beam management efficiency related to BWPs and system performance.

According to a first aspect, an embodiment of this disclosure provides a method for processing link reconfiguration, including:

indicating, by a network device, a preset parameter group to a terminal device, where the preset parameter group is configured for a BWP of the terminal device and is used to perform a corresponding processing operation when the terminal device performs transmission on the BWP.

According to a second aspect, an embodiment of this disclosure provides a method for processing link reconfiguration, including:

receiving, by a terminal device, a preset parameter group from a network device, where the preset parameter group is configured for a BWP of the terminal device and is used to perform a corresponding processing operation when the terminal device performs transmission on the BWP.

According to a third aspect, an embodiment of this disclosure provides a network device, where the network device is provided with functions that implement the actions of the network device in the foregoing method design. The functions may be implemented by hardware, or may be implemented by executing corresponding software by hardware. The hardware or software includes one or more modules corresponding to the foregoing functions. In a possible design, the network device includes a processor, where the processor is configured to support the corresponding functions in the foregoing method that are performed by the network device. Further, the network device may include a transceiver, where the transceiver is configured to support communication between the network device and a terminal device. Further, the network device may include a memory, where the memory is configured to be coupled to the processor, and the memory stores necessary program instructions and data for the network device.

According to a fourth aspect, an embodiment of this disclosure provides a terminal device, where the terminal device is provided with functions that implement the actions of the terminal device in the foregoing method design. The functions may be implemented by hardware, or may be implemented by executing corresponding software by hardware. The hardware or software includes one or more modules corresponding to the foregoing functions. In a possible design, the terminal device includes a processor, where the processor is configured to support the corresponding functions in the foregoing method that are performed by the terminal device. Further, the terminal device may include a transceiver, where the transceiver is configured to support communication between the terminal device and a network device. Further, the terminal device may include a memory, where the memory is configured to be coupled to the processor, and the memory stores necessary program instructions and data for the terminal device.

According to a fifth aspect, an embodiment of this disclosure provides a network device, including a processor, a memory, a transceiver, and one or more programs, where the one or more programs are stored in the memory and are configured to be executed by the processor, and the programs include instructions used to perform the steps of any one of the methods according to the first aspect of the embodiments of this disclosure.

According to a sixth aspect, an embodiment of this disclosure provides a terminal device, including a processor, a memory, a communications interface, and one or more programs, where the one or more programs are stored in the memory and are configured to be executed by the processor, and the programs include instructions used to perform the steps of any one of the methods according to the second aspect of the embodiments of this disclosure.

According to a seventh aspect, an embodiment of this disclosure provides a computer-readable storage medium, storing a computer program used to exchange electronic data, where the computer program enables a computer to perform some or all of the steps described in any one of the methods according to the first aspect of the embodiments of this disclosure.

According to an eighth aspect, an embodiment of this disclosure provides a computer-readable storage medium, storing a computer program used to exchange electronic data, where the computer program enables a computer to perform some or all of the steps described in any one of the methods according to the second aspect of the embodiments of this disclosure.

According to a ninth aspect, an embodiment of this disclosure provides a computer program product, including a non-transitory computer-readable storage medium storing a computer program, where the computer program may be executed to enable a computer to perform some or all of the steps described in any one of the methods according to the first aspect of the embodiments of this disclosure. The computer program product may be a software installation package.

According to a tenth aspect, an embodiment of this disclosure provides a computer program product, including a non-transitory computer-readable storage medium storing a computer program, where the computer program may be executed to enable a computer to perform some or all of the steps described in any one of the methods according to the second aspect of the embodiments of this disclosure. The computer program product may be a software installation package.

It can be learned that, in the embodiments of this disclosure, a network device indicates a preset parameter group to a terminal device, where the preset parameter group is configured for a BWP of the terminal device and is used to perform a corresponding processing operation when the terminal device performs transmission on the BWP. It can be learned that, for different BWPs of the terminal device, the preset parameter group is configured, so that processing operations that need to be performed during transmission on the BWPs are more flexibly configured, thereby improving beam management efficiency related to BWPs and system performance. For example, on the different BWPs, if a reference signal (RS) used to determine link quality is dedicated to only one BWP, after switching to another BWP, the signal can no longer be used to determine whether link quality is excessively low. A similar problem also exists in other steps of a link reconfiguration procedure. Therefore, different signals need to be configured for different BWPs to correspond to the foregoing preset parameter group, thereby improving flexibility of configuring a terminal device to perform transmission on a BWP.

BRIEF DESCRIPTION OF THE DRAWINGS

The following briefly describes the accompanying drawings required for describing the embodiments or the prior art.

DETAILED DESCRIPTION

The technical solutions in the embodiments of this disclosure are described below with reference to the accompanying drawings.

Figure 1:
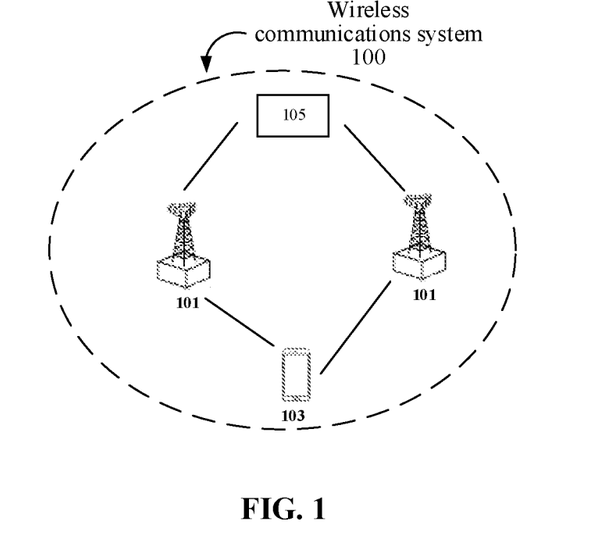
FIG. 1 shows an example of a protocol architecture of a dual connectivity transmission mode supporting a data replication function according to an embodiment of this disclosure.

FIG. 1 shows a wireless communications system used in this disclosure. The wireless communications system may work in a high frequency band, and may be a future evolved 5th Generation (5G) system, an NR system, a Machine to Machine (M2M) system, and the like. As shown, a wireless communications system 100 may include one or more network devices 101, one or more terminal devices 103, and a core network device 105. The network device 101 may be a base station. The base station may be used to communicate with one or more terminal devices, or may be used to communicate with one or more base stations with some terminal device functions (for example, communication between a macro base station and a micro base station and communication between access points (APs)). The base station may be a Base Transceiver Station (BTS) in a Time Division Synchronous Code Division Multiple Access (TD-SCDMA) system, or may be an Evolved Node B (eNB) in a Long Term Evolution (LTE) system, or a base station in a 5G system or an NR system. In addition, the base station may be an AP, a Transmission Point (TRP), a Central Unit (CU) or another network entity, and may include some or all of the functions of the network entities. The core network device 105 includes devices such as a Serving Gateway (SGW) on a core network side. The terminal devices 103 may be distributed in the entire wireless communications system 100, and may be stationary or may be mobile. In some embodiments of this disclosure, the terminal device 103 may be a mobile device (for example, a smartphone), a mobile station, a mobile unit, an M2M terminal device, a radio unit, a remote unit, a user agent, a mobile client or the like.

It should be noted that, the wireless communications system 100 shown in FIG. 1 is merely intended to clearly describe the technical solutions of this disclosure, and does not constitute a limitation to this disclosure. A person of ordinary skill in the art may know that, as network architectures evolve and new service scenarios emerge, the technical solution provided by this disclosure is applicable to similar technical problems.

Related technologies used in this disclosure are described below.

Currently, in an existing NR design, a plurality of DL BWPs or UL BWPs may be configured for one terminal device, and the terminal device may perform transmission on different BWPs relatively dynamically in a manner such as DCI/a Media Access Control control element (MAC CE).

However, in an existing link reconfiguration (beam failure recovery) mechanism, many configurations cannot effectively support the foregoing dynamic switching between BWPs. For example, if a signal used to determine whether link quality is excessively low (used for beam failure detection) is dedicated to only one BWP, after switching to another BWP, the signal can no longer be used to determine whether link quality is excessively low. A similar problem also exists in other steps of a link reconfiguration procedure.

For the foregoing problems, the embodiments of this disclosure provide the following embodiments, which are described in detail with reference to the accompanying drawings.

Figure 2:
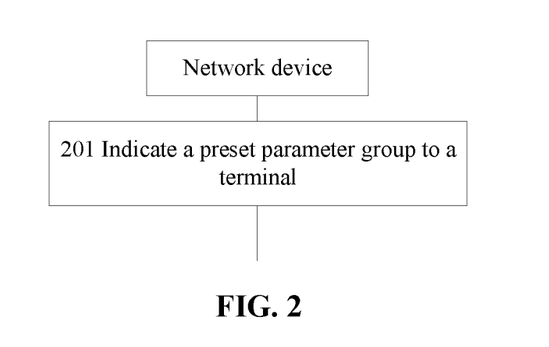
FIG. 2 is a schematic flowchart of a method for processing link reconfiguration according to an embodiment of this disclosure.

Referring to FIG. 2, FIG. 2 is a method for processing link reconfiguration according to an embodiment of this disclosure. The method is applied to the foregoing example of the communications system and includes the following steps.

Step 201: A network device indicates a preset parameter group to a terminal device, where the preset parameter group is configured for a BWP of the terminal device and is used to perform a corresponding processing operation when the terminal device performs transmission on the BWP.

It can be learned that, in this embodiment of this disclosure, the network device indicates the preset parameter group to the terminal device, where the preset parameter group is configured for the BWP of the terminal device and is used to perform the corresponding processing operation when the terminal device performs transmission on the BWP. It can be learned that, for different BWPs of the terminal device, the preset parameter group is configured, so that processing operations that need to be performed during transmission on the BWPs are more flexibly configured, thereby improving beam management efficiency related to BWPs and system performance. For example, on the different BWPs, if an RS used to determine link quality is dedicated to only one BWP, after switching to another BWP, the signal can no longer be used to determine whether link quality is excessively low. A similar problem also exists in other steps of a link reconfiguration procedure. Therefore, different signals need to be configured for different BWPs to correspond to the foregoing preset parameter group, thereby improving flexibility of configuring a terminal device to perform transmission on a BWP.

In a possible example, the preset parameter group includes at least one preset parameter group, and each preset parameter group corresponds to one or more BWPs.

In a possible example, the preset parameter group includes at least one of the following signals: a channel state information-reference signal (CSI-RS) and a synchronization signal/physical broadcast channel (SS/PBCH) block; and the corresponding processing operation is detecting whether link quality is lower than a specified or configured threshold.

A value of the threshold is specified in a protocol or is configured by a network. The operation of detecting whether link quality is lower than a specified or configured threshold may be referred to as beam failure detection.

In a possible example, the preset parameter group includes at least one of the following signals: a CSI-RS and an SS/PBCH block; and the corresponding processing operation is selecting a signal that meets a preset condition.

The preset condition is configured by the network. For example, a value corresponding to an L1-RSRP may be used as the threshold. When detected signal quality is greater than the threshold, it is considered that the preset condition is met. The selecting a signal that meets a preset condition may also be referred to as a new candidate beam identification operation.

In this possible example, the preset parameter group is used to configure a corresponding physical random access channel (PRACH) sequence and/or a time-frequency resource.

The preset parameter group is specifically used to configure a PRACH sequence and a time-frequency resource for performing the new candidate beam identification operation.

In a possible example, the preset parameter group includes a group of power control parameters, where the power control parameters are used to perform transmission to a PRACH sent by the network device after the terminal device selects the signal that meets the preset condition.

The power control parameters may be a preamble Received Target Power. The preset condition may be, for example, configured by the network. For example, a value corresponding to an L1-RSRP may be used as the threshold. When detected signal quality is greater than the threshold, it is considered that the preset condition is met.

It can be learned that, in this example, after selecting the signal that meets the preset condition, the terminal device may perform transmission to the PRACH according to the power control parameters indicated by the network device, where the PRACH is sent by the network device, thereby ensuring that when being switched to other BWPs, the terminal device may accurately perform transmission to the PRACH according to corresponding power control parameters, thereby improving data transmission stability.

In a possible example, the preset parameter group includes a control resource set (CORESET), and the corresponding processing operation is monitoring a physical downlink control channel (PDCCH) in the CORESET in a specified window after a PRACH signal is sent on the BWP.

In a possible example, the method further includes: configuring, by the network device, the preset parameter group of the BWP; and instructing, by the network device, to activate the BWP; or configuring, by the network device, the preset parameter group of the BWP and at the same time instructing to activate the BWP.

Figure 3:
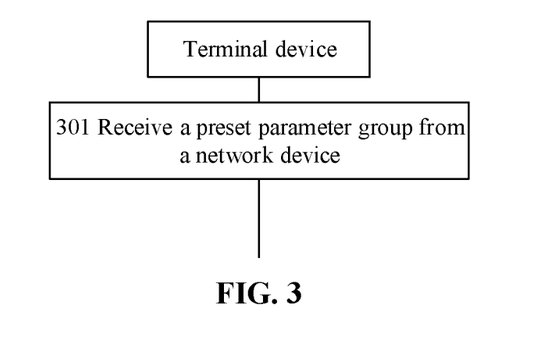
FIG. 3 is a schematic flowchart of a method for processing link reconfiguration according to an embodiment of this disclosure.

Same as the embodiment shown in FIG. 2, referring to FIG. 3, FIG. 3 is another method for processing link reconfiguration according to an embodiment of this disclosure. The method is applied to the foregoing communications system and includes the following steps.

Step 301: Receive, by a terminal device, a preset parameter group from a network device, where the preset parameter group is configured for a BWP of the terminal device and is used to perform a corresponding processing operation when the terminal device performs transmission on the BWP.

It can be learned that, in this embodiment of this disclosure, the terminal device receives the preset parameter group from the network device, where the preset parameter group is configured for the BWP of the terminal device and is used to perform the corresponding processing operation when the terminal device performs transmission on the BWP. It can be learned that, for different BWPs of the terminal device, the preset parameter group is configured, so that processing operations that need to be performed during transmission on the BWPs are more flexibly configured, thereby improving beam management efficiency related to BWPs and system performance. For example, on the different BWPs, if an RS used to determine link quality is dedicated to only one BWP, after switching to another BWP, the signal can no longer be used to determine whether link quality is excessively low. A similar problem also exists in other steps of a link reconfiguration procedure. Therefore, different signals need to be configured for different BWPs to correspond to the foregoing preset parameter group, thereby improving flexibility of configuring a terminal device to perform transmission on a BWP.

In a possible example, the preset parameter group includes at least one preset parameter group, and each preset parameter group corresponds to one or more BWPs.

In a possible example, the preset parameter group includes at least one of the following signals: a CSI-RS and an SS/PBCH block; and the corresponding processing operation is detecting whether link quality is lower than a specified or configured threshold.

In a possible example, the preset parameter group includes at least one of the following signals: a CSI-RS and an SS/PBCH block; and the corresponding processing operation is selecting a signal that meets a preset condition.

In a possible example, the preset parameter group is used to configure a corresponding PRACH sequence and/or a time-frequency resource.

In a possible example, the preset parameter group includes a group of power control parameters, where the power control parameters are used to perform transmission to a PRACH sent by the network device after the terminal device selects the signal that meets the preset condition.

In a possible example, the preset parameter group includes a CORESET, and the corresponding processing operation is monitoring a PDCCH in the CORESET in a specified window after a PRACH signal is sent on the BWP.

In a possible example, the method further includes:

receiving, by the terminal device, an instruction to activate the BWP from the network device, where the instruction is sent after the network device configures the preset parameter group of the BWP, or the instruction is sent while the network device configures the preset parameter group of the BWP.

Figure 4:
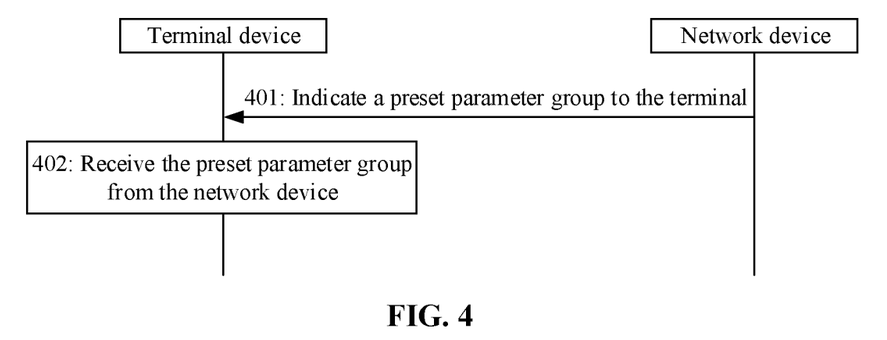
FIG. 4 is a schematic flowchart of a method for processing link reconfiguration according to an embodiment of this disclosure.

Same as the embodiments shown in FIG. 2 and FIG. 3, referring to FIG. 4, FIG. 4 is a method for processing link reconfiguration according to an embodiment of this disclosure. The method is applied to the foregoing communications system and includes the following steps.

Step 401: A network device indicates a preset parameter group to a terminal device, where the preset parameter group is configured for a BWP of the terminal device and is used to perform a corresponding processing operation when the terminal device performs transmission on the BWP.

Step 402: The terminal device receives the preset parameter group from the network device, where the preset parameter group is configured for the BWP of the terminal device and is used to perform the corresponding processing operation when the terminal device performs transmission on the BWP.

It can be learned that, in this embodiment of this disclosure, the network device indicates the preset parameter group to the terminal device, where the preset parameter group is configured for the BWP of the terminal device and is used to perform the corresponding processing operation when the terminal device performs transmission on the BWP. It can be learned that, for different BWPs of the terminal device, the preset parameter group is configured, so that processing operations that need to be performed during transmission on the BWPs are more flexibly configured, thereby improving beam management efficiency related to BWPs and system performance. For example, on the different BWPs, if an RS used to determine link quality is dedicated to only one BWP, after switching to another BWP, the signal can no longer be used to determine whether link quality is excessively low. A similar problem also exists in other steps of a link reconfiguration procedure. Therefore, different signals need to be configured for different BWPs to correspond to the foregoing preset parameter group, thereby improving flexibility of configuring a terminal device to perform transmission on a BWP.

Figure 5:
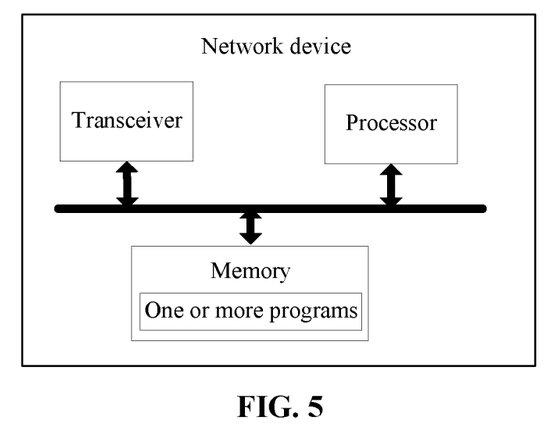
FIG. 5 is a schematic structural diagram of a network device according to an embodiment of this disclosure.

Same as the foregoing embodiments, referring to FIG. 5, FIG. 5 is a schematic structural diagram of a network device according to an embodiment of this disclosure. The network device is a first network device. As shown in the figure, the network device includes a processor, a memory, a transceiver, and one or more programs, where the one or more programs are stored in the memory and are configured to be executed by the processor, and the programs include instructions used to perform the following steps:

indicating a preset parameter group to a terminal device, where the preset parameter group is configured for a BWP of the terminal device and is used to perform a corresponding processing operation when the terminal device performs transmission on the BWP.

It can be learned that, in this embodiment of this disclosure, the network device indicates the preset parameter group to the terminal device, where the preset parameter group is configured for the BWP of the terminal device and is used to perform the corresponding processing operation when the terminal device performs transmission on the BWP. It can be learned that, for different BWPs of the terminal device, the preset parameter group is configured, so that processing operations that need to be performed during transmission on the BWPs are more flexibly configured, thereby improving beam management efficiency related to BWPs and system performance. For example, on the different BWPs, if an RS used to determine link quality is dedicated to only one BWP, after switching to another BWP, the signal can no longer be used to determine whether link quality is excessively low. A similar problem also exists in other steps of a link reconfiguration procedure. Therefore, different signals need to be configured for different BWPs to correspond to the foregoing preset parameter group, thereby improving flexibility of configuring a terminal device to perform transmission on a BWP.

In a possible example, the preset parameter group includes at least one preset parameter group, and each preset parameter group corresponds to one or more BWPs.

In a possible example, the preset parameter group includes at least one of the following signals: a CSI-RS and an SS/PBCH block; and the corresponding processing operation is detecting whether link quality is lower than a specified or configured threshold.

In a possible example, the preset parameter group includes at least one of the following signals: a CSI-RS and an SS/PBCH block; and the corresponding processing operation is selecting a signal that meets a preset condition.

In a possible example, the preset parameter group is used to configure a corresponding PRACH sequence and/or a time-frequency resource.

In a possible example, the preset parameter group includes a group of power control parameters, where the power control parameters are used to perform transmission to a PRACH sent by the network device after the terminal device selects the signal that meets the preset condition.

In a possible example, the preset parameter group includes a CORESET, and the corresponding processing operation is monitoring a PDCCH in the CORESET in a specified window after a PRACH signal is sent on the BWP.

In a possible example, the programs further include instructions used to perform the following operations: configuring the preset parameter group of the BWP; and instructing to activate the BWP; or configuring the preset parameter group of the BWP and at the same time instructing to activate the BWP.

Figure 6:
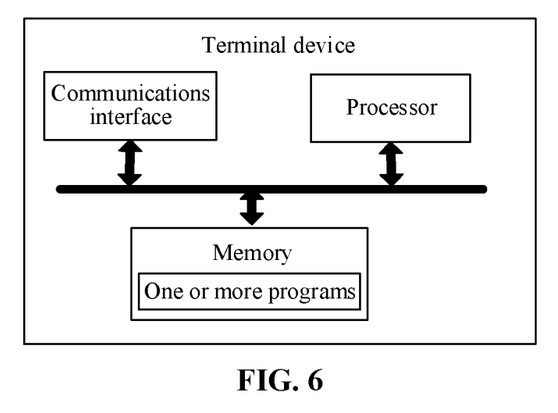
FIG. 6 is a schematic structural diagram of a terminal device according to an embodiment of this disclosure.

Same as the foregoing embodiments, referring to FIG. 6, FIG. 6 is a schematic structural diagram of a terminal device according to an embodiment of this disclosure. As shown in the figure, the terminal device includes a processor, a memory, a communications interface, and one or more programs, where the one or more programs are stored in the memory and are configured to be executed by the processor, and the programs include instructions used to perform the following steps:

receiving a preset parameter group from a network device, where the preset parameter group is configured for a BWP of the terminal device and is used to perform a corresponding processing operation when the terminal device performs transmission on the BWP.

It can be learned that, in this embodiment of this disclosure, the terminal device receives the preset parameter group from the network device, where the preset parameter group is configured for the BWP of the terminal device and is used to perform the corresponding processing operation when the terminal device performs transmission on the BWP. It can be learned that, for different BWPs of the terminal device, the preset parameter group is configured, so that processing operations that need to be performed during transmission on the BWPs are more flexibly configured, thereby improving beam management efficiency related to BWPs and system performance. For example, on the different BWPs, if an RS used to determine link quality is dedicated to only one BWP, after switching to another BWP, the signal can no longer be used to determine whether link quality is excessively low. A similar problem also exists in other steps of a link reconfiguration procedure. Therefore, different signals need to be configured for different BWPs to correspond to the foregoing preset parameter group, thereby improving flexibility of configuring a terminal device to perform transmission on a BWP.

In a possible example, the preset parameter group includes at least one preset parameter group, and each preset parameter group corresponds to one or more BWPs.

In a possible example, the preset parameter group includes at least one of the following signals: a CSI-RS and an SS/PBCH block; and the corresponding processing operation is detecting whether link quality is lower than a specified or configured threshold.

In a possible example, the preset parameter group includes at least one of the following signals: a CSI-RS and an SS/PBCH block; and the corresponding processing operation is selecting a signal that meets a preset condition.

In a possible example, the preset parameter group is used to configure a corresponding PRACH sequence and/or a time-frequency resource.

In a possible example, the preset parameter group includes a group of power control parameters, where the power control parameters are used to perform transmission to a PRACH sent by the network device after the terminal device selects the signal that meets the preset condition.

In a possible example, the preset parameter group includes a CORESET, and the corresponding processing operation is monitoring a PDCCH in the CORESET in a specified window after a PRACH signal is sent on the BWP.

In a possible example, the programs further include instructions used to perform the following operations: receiving an instruction to activate the BWP from the network device, where the instruction is sent after the network device configures the preset parameter group of the BWP, or the instruction is sent while the network device configures the preset parameter group of the BWP.

The solutions of the embodiments of this disclosure are mainly described above from the perspective of interaction between network elements. It may be understood that, to implement the foregoing functions, the terminal device and the network device include corresponding hardware structures and/or software modules that perform the functions. A person of ordinary skill in the art may be aware that, in combination with units and algorithm steps of the examples described in the embodiments disclosed in this specification, this disclosure may be implemented by electronic hardware, or a combination of computer software and electronic hardware. Whether the functions are performed by hardware or by computer software driving the hardware depends on particular applications and design constraint conditions of the technical solutions. A person skilled in the art may use different methods to implement the described functions for each particular application, but it should not be considered that the implementation goes beyond the scope of this disclosure.

The embodiments of this disclosure may perform functional unit division on the terminal device and the network device according to the examples of the foregoing methods, for example, may divide each functional unit corresponding to each function, or may integrate two or more functions in one processing unit. The integrated unit may be implemented in a form of hardware, or may be implemented in a form of a software program module. It should be noted that, the unit division in the embodiments of this disclosure is schematic, and is merely a logical functional division. In actual implementations, there may be other division manners.

Figure 7:
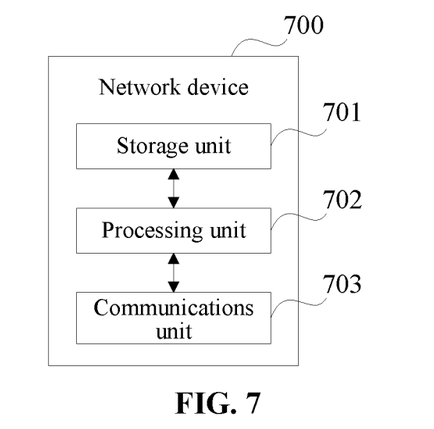
FIG. 7 is a schematic structural diagram of a network device according to an embodiment of this disclosure.

In the case of using integrated units, FIG. 7 is a structural block diagram of possible functional units of the network device related to the foregoing embodiments, where the network device is a first network device. A network device 700 includes a processing unit 702 and a communications unit 703. The processing unit 702 is configured to control and manage actions of the network device. For example, the processing unit 702 is configured to support step 201 in FIG. 2 that is performed by the network device, step 401 in FIG. 4 and/or other processes of the technology described in this specification. The communications unit 703 is configured to support communication between the network device and other devices, for example, the communication between the terminal devices shown in FIG. 6. The network device may further include a storage unit 701, configured to store program code and data of the network device.

The processing unit 702 may be a processor or a controller, the communications unit 703 may be a transceiver, a transceiver circuit, a radio frequency (RF) chip, or the like, and the storage unit 701 may be a memory.

The processing unit 702 is configured to indicate a preset parameter group to a terminal device by using the communications unit 703, where the preset parameter group is configured for a BWP of the terminal device and is used to perform a corresponding processing operation when the terminal device performs transmission on the BWP.

In a possible example, the preset parameter group includes at least one preset parameter group, and each preset parameter group corresponds to one or more BWPs.

In a possible example, the preset parameter group includes at least one of the following signals: a CSI-RS and an SS/PBCH block; and the corresponding processing operation is detecting whether link quality is lower than a specified or configured threshold.

In a possible example, the preset parameter group includes at least one of the following signals: a CSI-RS and an SS/PBCH block; and the corresponding processing operation is selecting a signal that meets a preset condition.

In a possible example, the preset parameter group is used to configure a corresponding PRACH sequence and/or a time-frequency resource.

In a possible example, the preset parameter group includes a group of power control parameters, where the power control parameters are used to perform transmission to a PRACH sent by the network device after the terminal device selects the signal that meets the preset condition.

In a possible example, the preset parameter group includes a CORESET, and the corresponding processing operation is monitoring a PDCCH in the CORESET in a specified window after a PRACH signal is sent on the BWP.

In a possible example, the processing unit 702 is further configured to: configure the preset parameter group of the BWP; and instruct to activate the BWP; or configure the preset parameter group of the BWP and at the same time instruct to activate the BWP.

When the processing unit 702 is a processor, the communications unit 703 is a communications interface, and the storage unit 701 is a memory, and the network device related to the embodiments of this disclosure may be the network device shown in FIG. 5.

Figure 8:
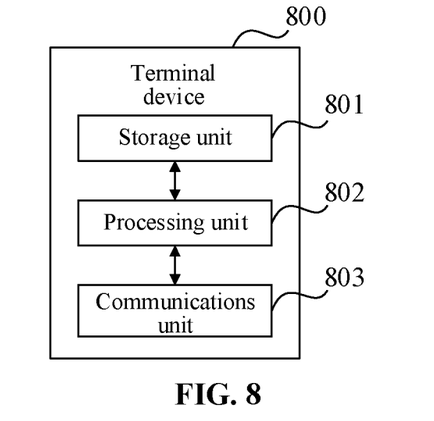
FIG. 8 is a schematic structural diagram of a terminal device according to an embodiment of this disclosure.

In the case of using integrated units, FIG. 8 is a structural block diagram of possible functional units of the terminal device related to the foregoing embodiments. A terminal device 800 includes a processing unit 802 and a communication unit 803. The processing unit 802 is configured to control and manage actions of the terminal device. For example, the processing unit 802 is configured to support step 301 in FIG. 3 that is performed by the terminal device, step 402 in FIG. 4 and/or other processes of the technology described in this specification. The communications unit 803 is configured to support communication between the terminal device and other devices, for example, the communication between the network devices shown in FIG. 5. The terminal device may further include a storage unit 801, configured to store program code and data of the terminal device.

The processing unit 802 may be a processor or a controller, for example, may be a central processing unit (CPU), a general purpose processor, a digital signal processor (DSP), an application-specific integrated circuit (ASIC), a field programmable gate array (FPGA) or another programmable logical device, discrete gate, transistor logic device, or hardware component or any combination thereof. The processing unit 802 may implement or execute various exemplary logical blocks, modules and circuits described with reference to disclosed contents of this disclosure. The processor may further be a combination implementing a computing function, for example, includes one or more microprocessor combinations, a combination of a DSP and a microprocessor, and the like. The communications unit 803 may be a transceiver, a transceiver circuit, or the like, and the storage unit 801 may be a memory.

The processing unit 802 is configured to receive a preset parameter group from a network device by using the communications unit 803, where the preset parameter group is configured for a BWP of the terminal device and is used to perform a corresponding processing operation when the terminal device performs transmission on the BWP.

In a possible example, the preset parameter group includes at least one preset parameter group, and each preset parameter group corresponds to one or more BWPs.

In a possible example, the preset parameter group includes at least one of the following signals: a CSI-RS and an SS/PBCH block; and the corresponding processing operation is detecting whether link quality is lower than a specified or configured threshold.

In a possible example, the preset parameter group includes at least one of the following signals: a CSI-RS and an SS/PBCH block; and the corresponding processing operation is selecting a signal that meets a preset condition.

In a possible example, the preset parameter group is used to configure a corresponding PRACH sequence and/or a time-frequency resource.

In a possible example, the preset parameter group includes a group of power control parameters, where the power control parameters are used to perform transmission to a PRACH sent by the network device after the terminal device selects the signal that meets the preset condition.

In a possible example, the preset parameter group includes a CORESET, and the corresponding processing operation is monitoring a PDCCH in the CORESET in a specified window after a PRACH signal is sent on the BWP.

In a possible example, the processing unit 802 is further configured to receive an instruction to activate the BWP from the network device by using the communications unit 803, where the instruction is sent after the network device configures the preset parameter group of the BWP, or the instruction is sent while the network device configures the preset parameter group of the BWP.

When the processing unit 802 is a processor, the communications unit 803 is a communications interface, and the storage unit 801 is a memory, the terminal device related to the embodiments of this disclosure may be the terminal device shown in FIG. 6.

An embodiment of this disclosure provides a computer-readable storage medium, storing a computer program used to exchange electronic data, where the computer program enables a computer to perform some or all of the steps described for the terminal device in the foregoing method embodiment.

An embodiment of this disclosure provides a computer-readable storage medium, storing a computer program used to exchange electronic data, where the computer program enables a computer to perform some or all of the steps described for the network device in the foregoing method embodiment.

An embodiment of this disclosure further provides a computer program product, including a non-transitory computer-readable storage medium storing a computer program, where the computer program may be executed to enable a computer to perform some or all of the steps described in the terminal device in the foregoing method embodiment. The computer program product may be a software installation package.

An embodiment of this disclosure further provides a computer program product, including a non-transitory computer-readable storage medium storing a computer program, where the computer program may be executed to enable a computer to perform some or all of the steps described in the network device in the foregoing method embodiment. The computer program product may be a software installation package.

The steps of the methods or algorithms described in the embodiments of this disclosure may be implemented by hardware, or may be implemented by a processor executing a software instruction. The software instruction may include a corresponding software module. The software module may be stored in a Random Access Memory (RAM), a flash memory, a Read-Only Memory (ROM), an Erasable Programmable ROM (EPROM), an electrically EPROM (EEPROM), a register, a hard disk, a removable hard disk, a CD-ROM, or a storage medium in any other forms well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in an access network device, a target network device, or a core network device. Certainly, the processor and the storage medium may be alternatively stored, as discrete components, in the access network device, the target network device, or the core network device.

A person skilled in the art may be aware that in one or more of the foregoing examples, all or some of the functions described in the embodiments of the this disclosure may be implemented by using software, hardware, firmware, or any combination thereof. When software is used for implementation, implementation may be entirely or partially performed in the form of a computer program product. The computer program product includes one or more computer instructions. When the computer program instructions are loaded and executed on a computer, all or some of the processes or functions according to the embodiments of this disclosure are produced. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, by using a coaxial cable, an optical fiber, or a Digital Subscriber Line (DSL)) or wireless (for example, infrared, radio, or microwave) manner. The computer-readable storage medium may be any available medium capable of being accessed by a computer or include one or more data storage devices integrated by an available medium, such as a server and a data center. The available medium may be a magnetic medium (such as a floppy disk, a hard disk, or a magnetic tape), an optical medium (such as a Digital Video Disc (DVD)), a semiconductor medium (such as a Solid State Disk (SSD)) or the like.

In the foregoing specific implementations, the objectives, technical solutions, and benefits of the embodiments of this disclosure are further described in detail. It should be understood that the foregoing descriptions are merely specific implementations of the embodiments of this disclosure, but are not intended to limit the protection scope of the embodiments of this disclosure. Any modification, equivalent replacement, or improvement made based on the technical solutions of the embodiments of this disclosure shall fall within the protection scope of the embodiments of this disclosure.

The invention claimed is:

1. A method for processing link reconfiguration, applicable to Link reconfiguration procedures, comprising:
receiving, by a terminal device, at least one preset parameter group from a network device, wherein each preset parameter group is configured for at least one bandwidth part (BWP) of the terminal device and is used to perform a corresponding processing operation when the terminal device performs transmission on the at least one BWP,
wherein the preset parameter group comprises indication information of a channel state information-reference signal (CSI-RS), wherein the corresponding processing operation is detecting whether link quality is lower than a configured threshold, and the preset parameter group is used to configure at least one of a physical random access channel (PRACH) sequence and a time-frequency resource that are used for performing the corresponding processing operation.

2. The method according to claim 1, wherein the BWP comprises downlink (DL) BWP or uplink (UL) BWP.

3. The method according to claim 1, wherein each of the at least one preset parameter group is configured for one BWP of the terminal device.

4. A method for processing link reconfiguration, applicable to Link reconfiguration procedures, comprising:
indicating, by a network device, at least one preset parameter group to a terminal device, wherein each preset parameter group is configured for at least one bandwidth part (BWP) of the terminal device and is used to perform a corresponding processing operation when the terminal device performs transmission on the at least one BWP,
wherein the preset parameter group comprises indication information of a channel state information-reference signal (CSI-RS), wherein the corresponding processing operation is detecting whether link quality is lower than a configured threshold, and the preset parameter group is used to configure at least one of a physical random access channel (PRACH) sequence and a time-frequency resource that are used for performing the corresponding processing operation.

5. The method according to claim 4, wherein the BWP comprises downlink (DL) BWP or uplink (UL) BWP.

6. The method according to claim 4, wherein each of the at least one preset parameter group is configured for one BWP of the terminal device.

7. A terminal device, applicable to Link reconfiguration procedures, comprising: a processor, a memory, a communications interface, and one or more programs, wherein the one or more programs are stored in the memory and are configured to be executed by the processor, when the one or more programs are executed, the processor is configured to:
receive, through the communications interface, at least one preset parameter group from a network device, wherein each preset parameter group is configured for at least one bandwidth part (BWP) of the terminal device and is used to perform a corresponding processing operation when the terminal device performs transmission on the at least one BWP,
wherein the preset parameter group comprises indication information of a channel state information-reference signal (CSI-RS), wherein the corresponding processing operation is detecting whether link quality is lower than a configured threshold, and the preset parameter group is used to configure at least one of a physical random access channel (PRACH) sequence and a time-frequency resource that are used for performing the corresponding processing operation.

8. The terminal device according to claim 7, wherein the BWP comprises downlink (DL) BWP or uplink (UL) BWP.

9. The terminal device according to claim 7, wherein each of the at least one preset parameter group is configured for one BWP of the terminal device.

10. A network device, applicable to Link reconfiguration procedures, comprising: a processor, a memory, a communications interface, and one or more programs, wherein the one or more programs are stored in the memory and are configured to be executed by the processor, when the one or more programs are executed, the processor is configured to:
indicate, through the communications interface, at least one preset parameter group to a terminal device, wherein each preset parameter group is configured for at least one bandwidth part (BWP) of the terminal device and is used to perform a corresponding processing operation when the terminal device performs transmission on the at least one BWP,
wherein the preset parameter group comprises indication information of a channel state information-reference signal (CSI-RS), wherein the corresponding processing operation is detecting whether link quality is lower than a configured threshold, and the preset parameter group is used to configure at least one of a physical random access channel (PRACH) sequence and a time-frequency resource that are used for performing the corresponding processing operation.

11. The network device according to claim 10, wherein the BWP comprises downlink (DL) BWP or uplink (UL) BWP.

12. The network device according to claim 10, wherein each of the at least one preset parameter group is configured for one BWP of the terminal device.

* * * * *